United States Patent [19]
Zittel

[11] Patent Number: 5,456,091
[45] Date of Patent: Oct. 10, 1995

[54] WATER AGITATION COOLER

[76] Inventor: David R. Zittel, 155 Oak Grove Dr., Columbus, Wis. 53925

[21] Appl. No.: 221,887

[22] Filed: Apr. 1, 1994

[51] Int. Cl.[6] .................................................. F25D 17/02
[52] U.S. Cl. ...................................... 62/375; 62/381
[58] Field of Search ............................ 62/63, 64, 374, 62/375, 381

[56] References Cited

U.S. PATENT DOCUMENTS

| | | | |
|---|---|---|---|
| 2,116,738 | 5/1938 | Zarotschenzeff | 62/104 |
| 2,942,429 | 6/1960 | VanDolah et al. | 62/64 |
| 3,097,501 | 7/1963 | Pappas | 62/63 |
| 3,395,549 | 8/1968 | Grimes | 62/63 |
| 3,426,546 | 2/1969 | Crane | 62/63 |
| 3,485,055 | 12/1969 | Webster et al. | 62/63 |
| 3,641,924 | 2/1972 | Sijbring | 99/406 |
| 4,497,180 | 2/1985 | Graham | 62/63 |
| 4,688,476 | 8/1987 | Zittel | 99/403 |
| 4,697,508 | 10/1987 | Tallafus | 99/517 |
| 4,875,344 | 10/1989 | Zittel | 62/381 |
| 4,942,810 | 2/1990 | Zittel et al. | 99/477 |
| 5,009,150 | 4/1991 | Andersen | 99/360 |
| 5,133,249 | 7/1992 | Zittel | 99/348 |
| 5,146,841 | 9/1992 | Zittel | 99/348 |
| 5,184,471 | 2/1993 | Lasacco et al. | 62/63 |
| 5,193,442 | 3/1993 | Moscowitz et al. | 99/348 |

Primary Examiner—Ronald C. Capossela
Attorney, Agent, or Firm—Lathrop & Clark

[57] ABSTRACT

A cylindrical drum is rotatably mounted within a water tank. A water manifold is mounted to the exterior of the water tank and discharges chilled water through multiple axially spaced nozzles into the rotating drum within the tank to agitate the food product contained therein. The drum has a perforate skin which allows water to pass through but retains food product within. A helical auger is fixed to the drum and rotates with the drum to advance food product from the tank inlet to the tank outlet. The manifold discharges water on one side of the tank only, to impact food product as it is being lifted upwardly as the drum rotates. The drum may be provided with lifting baffles which further agitate the food product and cooperate with the agitating water injection to improve heat transfer from the food product.

16 Claims, 3 Drawing Sheets

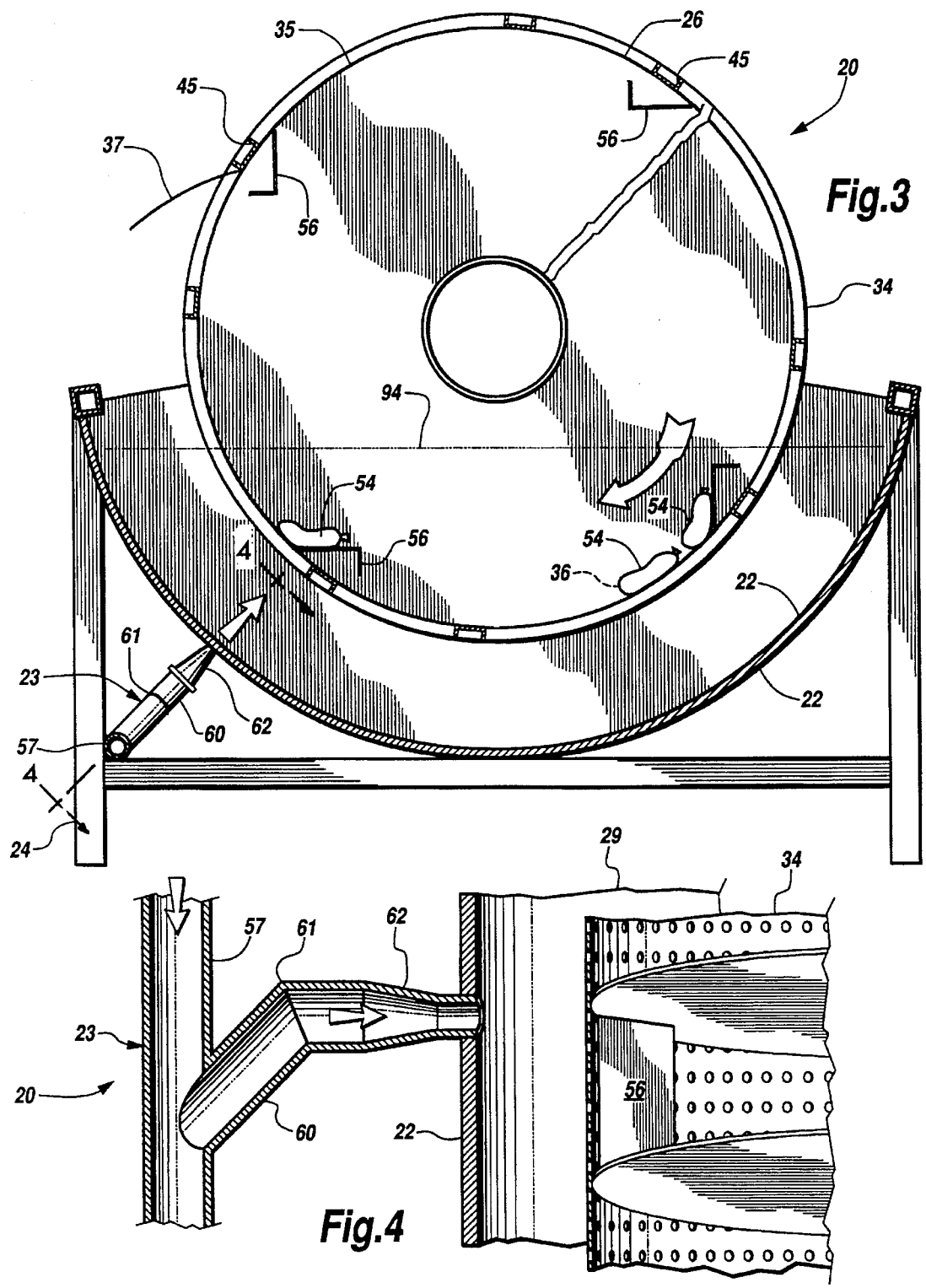

WATER AGITATION COOLER

FIELD OF THE INVENTION

This invention relates to apparatus for processing food products in general, and to rotating auger advanced food product cooling apparatus in particular.

BACKGROUND OF THE INVENTION

Many food products, before they can be packaged or consumed, must be subjected to a variety of heat treating processes. The product may need to be blanched, cooled, or cooked, or may require multiple heat treatments. Large quantities of product may be treated in a rotating drum with an internal auger for advancement of the product through a heated or cooled water bath. The efficiency of the process, as well as the time which is consumed in properly heating or cooling the product, depends on the heat transfer rate between the treated product and the surrounding liquid. An increased rate of heat transfer means a decreased retention time of the product required within the treatment apparatus, and hence allows a greater throughput for a given size machine.

It has been found that agitation of food product with a significant thickness, such as animal organs, or pouches of liquid or semi-liquid product, results in improved heat transfer. As disclosed in my prior U.S. Pat. No. 4,875,344 for a CHILLER, axially extending baffles peripherally mounted to the rotating auger flights of a cylinder are effective in imparting some agitation to a conveyed food product. My prior patent also discloses improved agitation achieved by air manifolds positioned within the cooler tank which discharge air into the cooling liquid to assist in manipulating and agitating the treated food product. Air-assisted agitation within a cooler is effective, but requires the provision of a source of compressed air with the attendant cost.

What is needed is a rotating cylinder cooler which promotes improved heat transfer from treated products in a more cost-effective manner.

SUMMARY OF THE INVENTION

The cooler of this invention has a water manifold mounted to the exterior of the water tank which discharges chilled water through multiple axially spaced nozzles into a rotating cylinder within a tank to agitate food product contained therein. The cylinder has a perforate skin which allows water to pass through but retains food product within. A helical auger is fixed to the cylinder and rotates with the cylinder to advance food product from the tank inlet to the tank outlet. The manifold discharges water on one side of the tank only, to impact food product as it is being lifted upwardly as the cylinder rotates. The cylinder may be provided with lifting baffles which further agitate the food product and cooperate with the agitating water injection to improve heat transfer from the food product.

It is an object of the present invention to provide a food processing apparatus with improved heat transfer efficiency.

It is also an object of the present invention to provide a cooler for treating food which uses water to both agitate and cool the food product.

Further objects, features, and advantages of the invention will be apparent from the following detailed description when taken in conjunction with the accompanying drawings.

BRIEF DESCRIPTION OF THE DRAWINGS

FIG. 3 is a cross-sectional view of the apparatus of FIG. 2 taken along section line 3—3 and shown in place within a water-filled tank.

FIG. 4 is a fragmentary cross-sectional view of the cooler of FIG. 3, taken along section line 4—4.

DESCRIPTION OF THE PREFERRED EMBODIMENT

Figure 1:
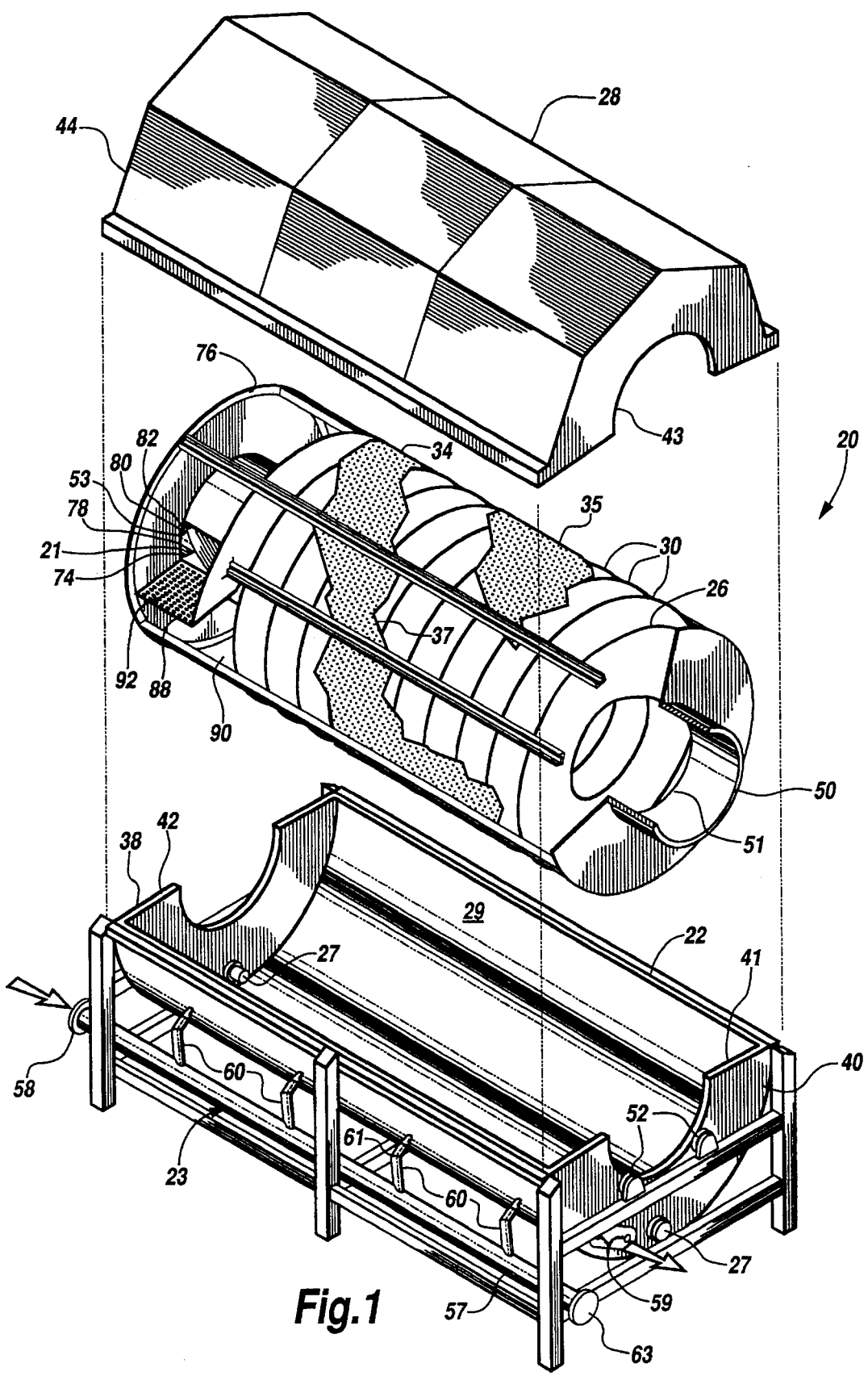
FIG. 1 is an exploded isometric view of a cooler of the present invention employing a water agitation manifold.

Referring more particularly to FIGS. 1–4, wherein like numbers refer to similar pans, a cooler 20 is shown in FIG. 1. The cooler 20 has a single water manifold 23 which discharges cooling and agitating water into an elongated open top tank 22 which is supported by a frame 24. A helical auger 26 is longitudinally mounted within the tank 22 and an elongated vaulted cover 28 fits over and covers the tank 22. The tank has a semi-cylindrical wall 29 with drains located at its lowest portion.

The auger 26 is rotatably mounted within the tank 22 and has stainless steel flights 30. A perforated cylinder 34 encloses the auger 26 and is formed of a plurality of screens 35, 37. The screens are preferably mounted to structural C-channel members 45. The screens 35, 37 are preferably formed of stainless steel and have a multiplicity of small holes 46 which allow water contained within the tank to enter the cylinder. Alternating screens 35 are fixed such as by welding to the members 45, and other screens 37 are held in place for convenient removal to clean out the interior of the cylinder 34. As shown in FIG. 3, the perforated cylinder 34 contains the food product 36 being conveyed by the auger 26.

Figure 2:
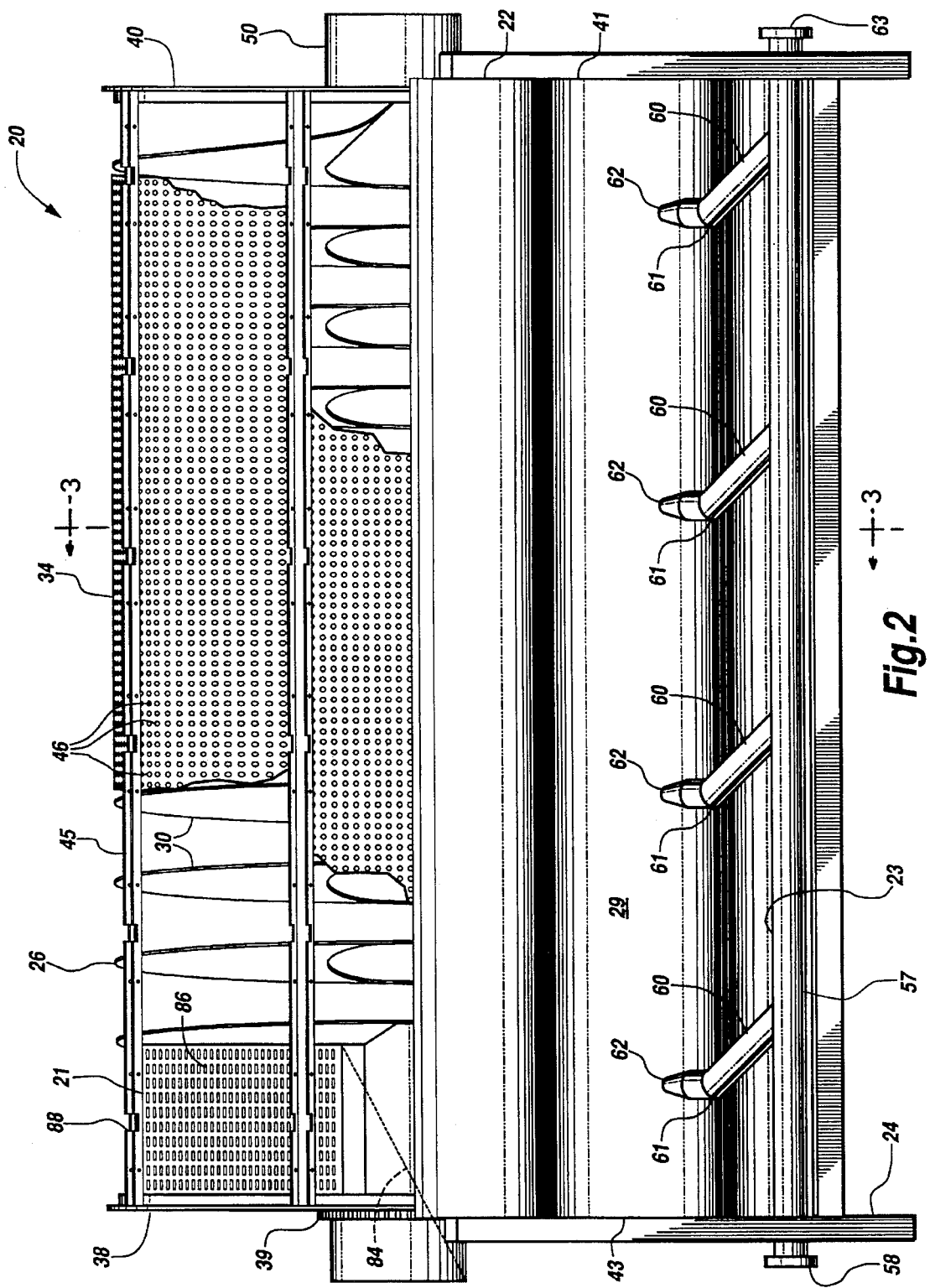
FIG. 2 is a side elevational view, partially broken, away of the apparatus of FIG. 1 with the tank cover removed.

The cylinder 34 and auger 26 are driven by a motor (not shown) which engages a drum drive sprocket 39, shown in FIG. 2. The drive sprocket 39 is fixed to the cylinder 34 and is driven by the motor at a rate selected to achieve the desired residence of the food product within the cooler 20.

As the auger 26 rotates, its flights 30 move the food product 36 being treated from the inlet end 40 to the discharge end 38 of the tank 22. The end walls 41, 42 of the tank 22 and the end walls 43, 44 of the cover 28 form holes through which tube journals 50 extend. The endwalls have clean-out access openings 27 which are blocked during operation.

The tube journals 50 extend from the an inlet opening 51 and the discharge opening 53 of the cylinder 34. The cylinder 34 is mounted rotatably with the tank 22 so that water contained in the tank will enter the cylinder. Food product is introduced into the inlet opening 51 of the cylinder, and discharged through the discharge opening 53 of the cylinder. The food product 36 may be contained in pouches 54 which may have a capacity up to two gallons.

The tube journals 50 and the auger 26 itself are supported at both ends of the tank 22 by trunions 52 which are mounted to the frame 24 to support the journals 50 in a conventional manner such that the journals 50 do not make contact with the walls 42, 44 of the tank 22 or cover 28.

The vaulted cover 28 may be hingedly attached to the tank 22 so that it may be opened from either side of the cooler as in the manner disclosed in my prior U.S. Pat. No. 4,788,476, or the cover 28 may be attached to the tank 22 in any conventional manner.

The stainless steel flights 30 of the auger 26 define a helical surface which extends toward the discharge end 38 of the cooler 20 such that when the auger 26 is rotated clockwise as looking toward the outlet, as shown in FIG. 3, the food product contained within the cylinder 34 is engaged against the helical surface of the auger 26 and propelled by the auger flights 30 toward the discharge end 38.

Chilled water is supplied to the cooler 20 through the water manifold 23 at a temperature or about 33 degrees Fahrenheit. Water is drawn out of the cooler through recirculation fittings 59 at the inlet end wall 43 of the tank. The water drawn from the cooler is ducted first to a heat exchanger and chiller (not shown) which lowers the temperature of the removed water to about 33 degrees, and is then returned to the water manifold 23. Because the hot food product is introduced at the infeed end, the water which is drawn out will tend to be the warmest water in the system as a result of being in contact with the hot food product. The use of counter-flow cooling also minimizes the amount of cooling water required.

As shown in FIG. 2, the water manifold 23 has a primary water distribution pipe 57 which extends horizontally beneath the wall 29 of the tank 22. The distribution pipe 57 has an inlet fitting 58 disposed in proximity to the discharge end 38 of the cooler 20 which is connected to a recirculation pipe (not shown) through which water is pumped from heat exchanger described above.

The water manifold 23 has four supply ducts 60 which branch off the distribution pipe 57 and which are inclined at an acute angle from the distribution pipe toward the discharge end 38 of the cooler 20. Each duct has an elbow 61 which joins a nozzle 62 to the duct 60. The nozzle 62 extends perpendicularly to the distribution pipe 57 and is directed radially inwardly toward the axis about which the perforated cylinder 34 rotates. The nozzles 62 are connected to the wall 29 of the tank 22 and decrease in diameter as they extend toward the tank to cause an increase in the velocity of the water discharged into the tank. In a preferred embodiment, the nozzle will be between one quarter inch and one inch in diameter at its smallest section.

As best shown in FIG. 4, the water flows through the water manifold 23 toward the inlet end 40 of the cooler, while the ducts 60 extend from the distribution pipe 57 at an acute angle toward the discharge end. This arrangement of the ducts 60 on the water manifold 23 results in a more even flow from the several ducts into the tank 22. A solid end cap 63 blocks the distribution pipe 57 at the inlet end 40 of the cooler 20. Thus the water which is fed to the water manifold 23 is discharged through the ducts 60 into the tank 22.

When heated food product, at for example, 200 degrees, is introduced into the cooled water of the tank, immediate cooling of the product takes place. However, a heat barrier of warmed water will build up around the food product if the water remains relatively undisturbed. The water discharged into the tank from the ducts is propelled into the heat barrier and displaces the warmer water from the hot food product. Preferably the water flow from each nozzle 62 is in the range of 50 to 150 gallons per minute, in a tank capacity which may range from about 460 gallons to about 2,800 gallons.

As shown in FIG. 3, the water which is discharged from the nozzles 62 is dispersed through the water 94 contained within the tank toward the cylinder 34, causing an agitation of the water within the cylinder, and hence an agitation of the food product contained therein. An exemplary food product is contained within the illustrated pouches 54. The manifold 23 is fixed to the tank on the side toward which the cylinder 34 rotates. Food product which is being raised by frictional engagement with the cylinder 34 or which is engaged with the lifting baffles 56 described below, will tend to be agitated by the radially inwardly directed plumes of water emitted by the nozzles 62.

To further agitate the food product, in particular in instances where the apparatus 20 may be employed with nonbuoyant pouches, the cooler 20 is preferably provided with lifting baffles 56, shown in FIG. 3, and omitted from FIG. 2 for clarity. The baffles 56 extend approximately six inches inwardly from the screen of the perforated cylinder 34. Each baffle extends flight-to-flight between two adjacent flights 30 of the auger 26. Each planar baffle 56 is inclined away approximately 70° from the radial direction. In other words, each lifting baffle 56 is inclined approximately 20° above a plane tangent to the perforated cylinder 34 at the base of the baffle 56.

As best shown in FIG. 3, each lifting baffle 56 is adjacent to the perforated cylinder 34 at its leading edge as the cylinder rotates. Thus, each lifting baffle 56 gently scoops up food product 36 within the water 94 disposed within the tank 22 and conveys that food product 36 sidewardly across the width of the auger 26. As the baffles 56 leave the water 94 the inclination of the baffles becomes more nearly vertical allowing the conveyed food product 36 to slide off the baffle 56 without suffering damage. Food product is in addition urged off the baffles by the water discharged from the ducts 60. Each baffle 56 is separated 90° from its neighboring baffles. The baffles 56 are accessible through the removable screen clean-out doors 37 to occasionally clear away debris which may collect beneath the baffles 56.

The food product is advanced through the drum cylinder 34 by the auger 26 until the food product reaches the discharge end region 38, shown in FIG. 2. The auger 26 terminates at a point spaced from the discharge end plate 76 of the cylinder. Conventional lifting buckets may extend between the auger and the discharge end plate 76. However, in applications in which particular care must be taken not to damage the processed food product, as for example in handling bagged or pouched products, a single scoop discharge 21 may be employed.

The discharge 21 has a semi-cylindrical chute 74 which is fixed to the cylinder 34. The chute 74 extends between the auger 26 and the discharge end plate 76 of the cylinder 34. The chute 74 has a discharge opening 78 which communicates with the discharge opening 53 of the cylinder 34 in the discharge end plate 76. The chute 74 has an inclined surface 84 which extends from the rear wall 86 of the chute to the discharge opening 78. The discharge 21 has a single lifting flight 88 which extends between the side wall 90 of the cylinder 34 and the chute 74. The lifting flight 88 has a perforated base plate 92 which is welded to one lip 82 of the chute along the chute inlet opening 80. The discharge 21 elevates food product from the water filled portions of the drum to the discharge outlet of the discharge end plate.

It should be noted that the cooler of this invention may be formed from other corrosion resistant materials in addition to stainless steel and that the number and angle of the auger flights may be varied as desired. Furthermore, the number of support member channels may vary depending on the overall dimensions of the drum. Furthermore, although four ducts have been described as discharging from the water distribution pipe into the tank, a greater or lesser number of ducts may be furnished depending on the length and volume of the tank employed. In addition, other product agitation means, such as air manifolds disposed within the tank beneath the rotating cylinder, may be used in conjunction with the water manifold of this invention.

It is understood that the invention is not confined to the particular construction and arrangement of parts herein illustrated and described, but embraces all such modified forms thereof as come within the scope of the following claims.

I claim:

1. A food product cooler comprising:
    a) a tank having an inlet end and a discharge end, and a tank sidewall;
    b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;
    c) an auger positioned substantially within the perforated cylinder to rotate with the cylinder, the auger having portions which define a helical surface which extends from a position proximate the tank inlet end to a position proximate the tank outlet end, wherein rotation of the auger in a first direction advances food product from the tank inlet end to the tank discharge end; and
    d) a means for supplying a plurality of water jets directed into the tank, the means being mounted to the tank sidewall such that portions of the cylinder move upwardly as said portions pass in closest proximity to said means and said means being directed substantially radially toward the perforated cylinder for agitating food product contained therein to effect improved heat transfer.

2. The cooler of claim 1 wherein the means for supplying a plurality of water jets has a plurality of ducts which discharge water into the tank. and wherein each duct narrows as it extends toward the tank to define a flow constricting nozzle which increases the flow velocity of water discharged into the tank.

3. The cooler of claim 1 wherein the means for supplying a plurality Of water jets has a water distribution pipe with a water inlet disposed toward the discharge end of the tank, and wherein a plurality of ducts extend at an acute angle from the water distribution pipe toward the discharge end of the tank.

4. The cooler of claim 3 further comprising an end cap which blocks the water distribution pipe after the ducts.

5. The cooler of claim 3 wherein each duct has an elbow to turn the duct so portions of the duct which engage the tank extend substantially radially with respect to the perforated cylinder.

6. The cooler of claim 1 wherein the water is extracted from the inlet end of the tank and supplied to the means for supplying a plurality of water jets for reintroduction into the tank.

7. The cooler of claim 1 wherein the auger has a plurality of helical flights, and wherein a plurality of lifting baffles are positioned within the auger, and each lifting baffle extends axially between auger flights adjacent the perforated cylinder, wherein the lifting baffles engage food product disposed within the perforated cylinder and elevate said food product to expose said food product to the flow of water discharged from the means for supplying a plurality of water jets to thereby agitate the food product.

8. A food processing apparatus, comprising:
    a) a tank having an inlet end and a discharge end and upwardly extending sidewalls;
    b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;
    c) a helical auger positioned substantially within the perforated cylinder to rotate with the cylinder;
    d) a water distribution pipe which has a water inlet disposed toward the discharge end of the tank, and
    e) a means for supplying a plurality of water jets directed into the tank including a plurality of ducts which extend toward the discharge end of the tank from the water distribution pipe at an acute angle, wherein each duct discharges water within the tank, and wherein the means for supply includes a means for agitating food product conveyed within the perforated cylinder to improve heat transfer therefrom.

9. The cooler of claim 8 wherein each duct narrows as it extends toward the tank to define a flow-constricting nozzle which increases the flow velocity of water discharged into the tank.

10. The cooler of claim 8 wherein each duct has portions which extend substantially radially with respect to the perforated cylinder as the duct engages the tank to direct the discharged water radially within the cylinder to thereby agitate food product contained therein.

11. The cooler of claim 8 wherein the water distribution pipe has an end cap which blocks the water distribution pipe after the ducts.

12. The cooler of claim 8 wherein each duct has an elbow to turn the duct so portions of the duct which engage the tank extend substantially radially with respect to the perforated cylinder.

13. The cooler of claim 8 wherein the water is extracted from the inlet end of the tank and supplied to the water distribution pipe for reintroduction into the tank through the ducts.

14. The cooler of claim 8 wherein the auger has a plurality of helical flights, and wherein a plurality of lifting baffles are positioned within the auger, and each lifting baffle extends axially between auger flights adjacent the perforated cylinder, wherein the lifting baffles engage food product disposed within the perforated cylinder and elevate said food product to expose said food product to the flow of water discharged from the ducts to thereby agitate the food product.

15. A cooler for food product, comprising:
    a) a tank having an inlet end and a discharge end;
    b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;
    c) an auger positioned substantially within the perforated cylinder to rotate with the cylinder and to advance food product contained within the cylinder from the tank inlet end to the tank discharge end; and
    d) a means for agitating food product contained in pouches having a water manifold exterior to the tank having a single source of water and a plurality of constricting nozzles which discharge plumes of radially inwardly directed water at axially spaced positions along the tank, wherein water is drawn from an end of the tank and supplied to the water manifold.

16. A cooler for food product, comprising:

a) a tank having an inlet end and a discharge end;

b) a perforated cylinder mounted rotatably within the tank so that water contained in the tank will enter the cylinder, the cylinder having an inlet opening near the inlet end of the tank for receiving introduced food product and a discharge opening near the discharge end of the tank where food product which has moved through the cylinder can be discharged therefrom;

c) an auger having a plurality of helical flights, wherein the auger is positioned substantially within the perforated cylinder to rotate with the cylinder, and to advance food product contained within the cylinder from the tank inlet end to the tank discharge end;

d) a means for agitating food product having a water manifold, the manifold having a plurality of ducts through which water is discharged into the tank at axially spaced positions along the tank; and e) a plurality of lifting baffles positioned within the auger, wherein each lifting baffle extends axially between auger flights adjacent the perforated cylinder, and wherein the lifting baffles engage food product disposed within the perforated cylinder and elevate said food product to expose said food product to the flow of water discharged from the ducts to thereby agitate the food product.

* * * * *